United States Patent
Sauerwald et al.

(10) Patent No.: US 8,681,976 B2
(45) Date of Patent: Mar. 25, 2014

(54) SYSTEM AND METHOD FOR DEVICE DEPENDENT AND RATE LIMITED KEY GENERATION

(75) Inventors: Conrad Sauerwald, Mountain View, CA (US); Joseph P. Bratt, San Jose, CA (US); Joshua Phillips de Cesare, Campbell, CA (US); Timothy John Millet, Mountain View, CA (US); Weihua Mao, San Jose, CA (US)

(73) Assignee: Apple Inc., Cupertino, CA (US)

( * ) Notice: Subject to any disclaimer, the term of this patent is extended or adjusted under 35 U.S.C. 154(b) by 236 days.

(21) Appl. No.: 13/106,268

(22) Filed: May 12, 2011

(65) Prior Publication Data

US 2012/0288089 A1   Nov. 15, 2012

(51) Int. Cl.
*H04L 29/06*  (2006.01)
(52) U.S. Cl.
USPC .............................................. 380/44; 380/46
(58) Field of Classification Search
None
See application file for complete search history.

(56) References Cited

U.S. PATENT DOCUMENTS

| | | | | |
|---|---|---|---|---|
| 5,455,862 | A * | 10/1995 | Hoskinson | 380/262 |
| 6,760,822 | B2 * | 7/2004 | Dagan et al. | 711/157 |
| 2002/0141588 | A1 * | 10/2002 | Rollins | 380/277 |
| 2002/0164020 | A1 * | 11/2002 | Mustafa | 380/46 |
| 2006/0130130 | A1 * | 6/2006 | Kablotsky | 726/9 |
| 2007/0014398 | A1 * | 1/2007 | Eldridge et al. | 380/44 |
| 2010/0199098 | A1 * | 8/2010 | King | 713/182 |

* cited by examiner

*Primary Examiner* — Christopher Brown
*Assistant Examiner* — Brian Olion
(74) *Attorney, Agent, or Firm* — Blakely, Sokoloff, Taylor & Zafman LLP

(57) ABSTRACT

Disclosed herein are systems, methods, and non-transitory computer-readable storage media for generating a device dependent cryptographic key in a rate-limited way. A system configured to practice the method first receives data associated with a user. The data associated with the user can be a password, a personal identification number (PIN), or a hash of the password. Then the system performs a first encryption operation on the user data based on a device-specific value to yield first intermediate data and performs a second encryption operation on the first intermediate data based on the device-specific value to yield second intermediate data. Then the system iteratively repeats the second encryption operation until a threshold is met, wherein each second encryption operation is performed on the second intermediate data from a previous second encryption operation. The iterations produce a final cryptographic key which the system can then output or use for a cryptographic operation.

25 Claims, 6 Drawing Sheets

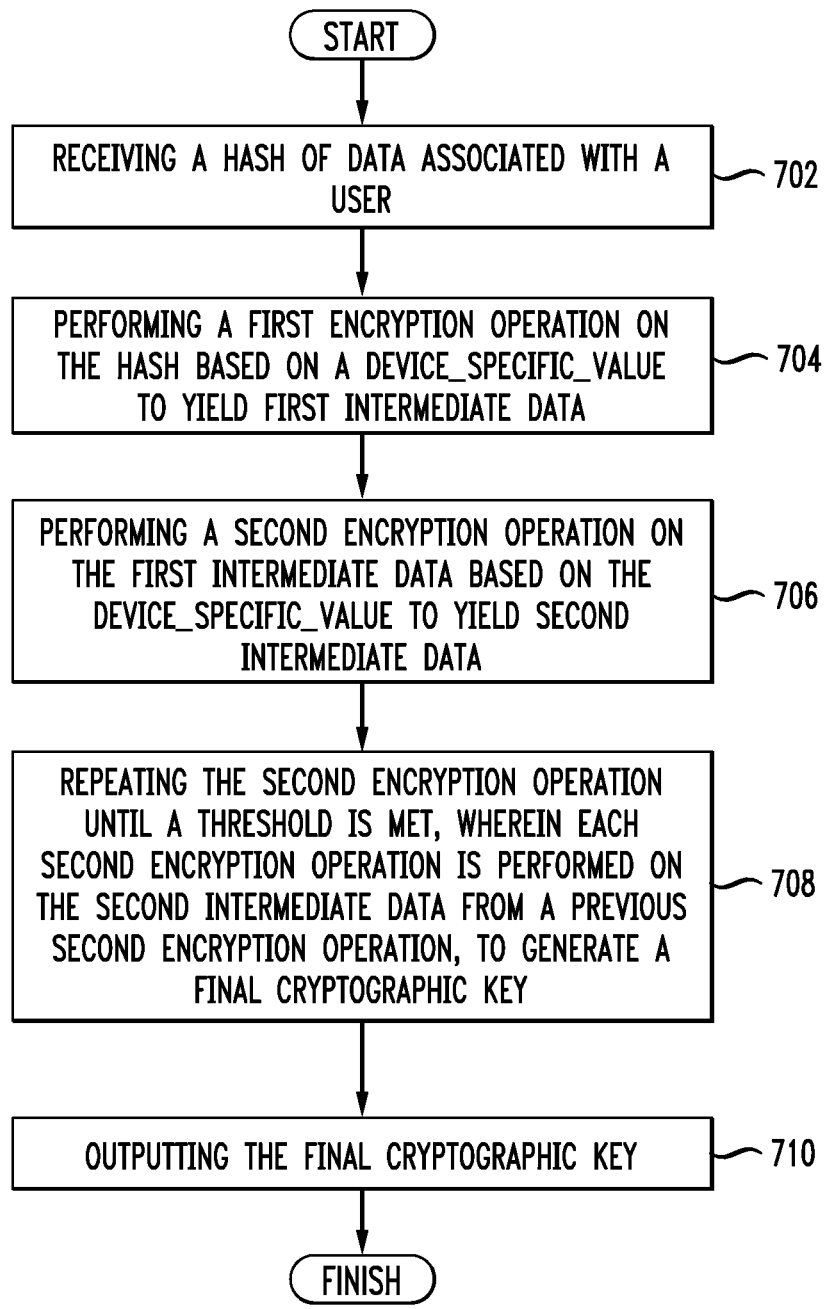

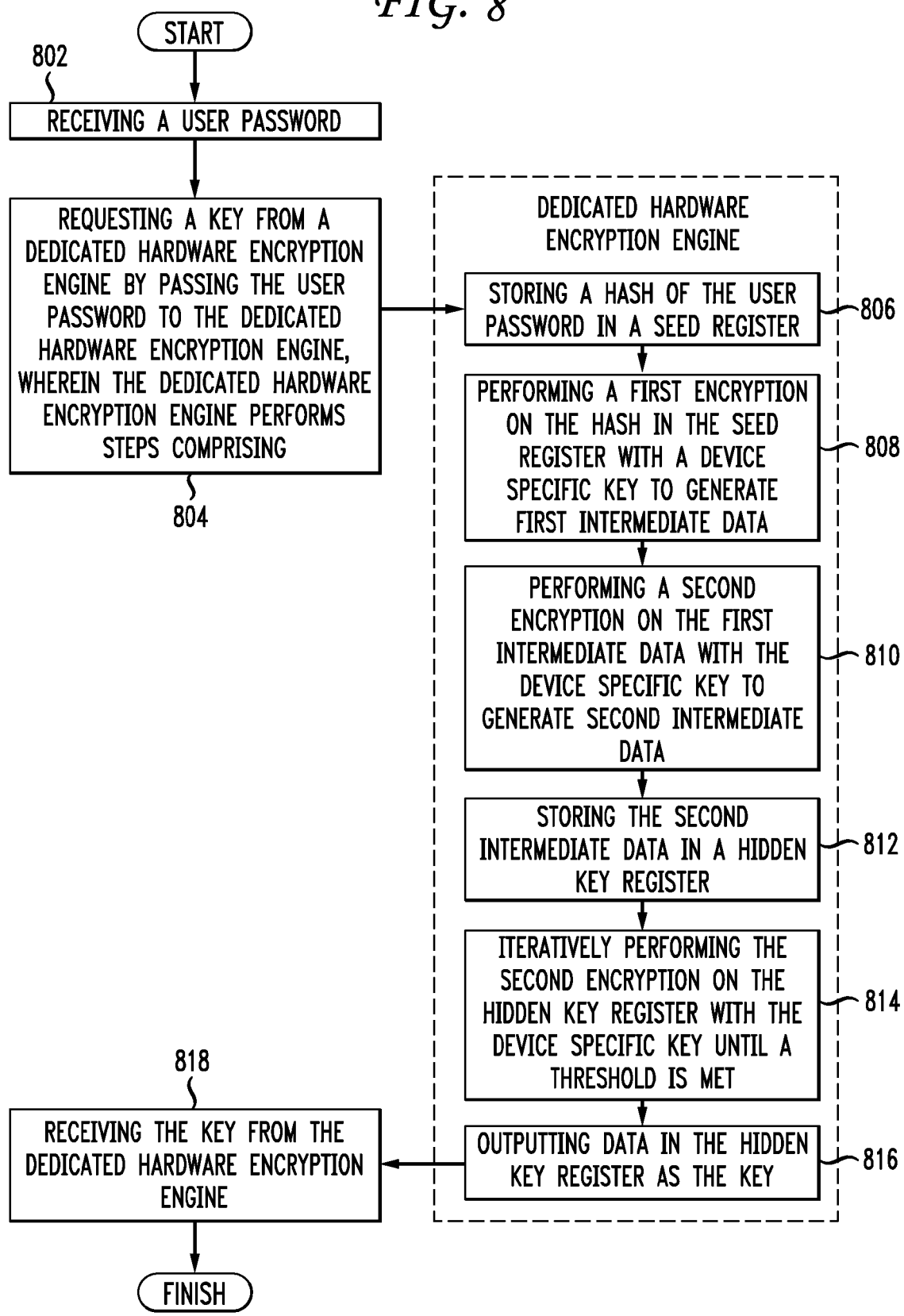

SYSTEM AND METHOD FOR DEVICE DEPENDENT AND RATE LIMITED KEY GENERATION

BACKGROUND

1. Technical Field

The present disclosure relates to cryptographic keys and more specifically to generating device-specific cryptographic keys in a rate-limited way.

2. Introduction

Computer users today typically have secrets such as passwords or personal identification numbers (PINs) stored on a computing device for many applications requiring security. This also applies to users of mobile computing devices such as tablets and smart phones. The secret or a derivation thereof can serve as a cryptographic key to protect certain information and/or ensure that only the intended recipient has access to that information. A brute force attack is one approach an attacker can use to try to access sensitive information. A brute force attack is a series of attempts to guess the correct secret (i.e. the password or PIN). Due to the tremendous speed advances and increases in available parallel computing power, brute force attacks become easier, cheaper, and more attainable almost on a daily basis.

An attacker can perform a brute force attack on a cryptographic key by generating all possible combinations of keys and trying each one until the correct key is discovered. For many short and/or simple passwords, this is a trivial attack and can be performed quickly on a computing device of modest ability, to say nothing of a powerful server or bank of servers. As the number of users of computing devices increases, as the amount of personal, sensitive, and/or confidential information stored on those computing devices increases, and as the available computing power to attackers increases, user's secrets become more and more vulnerable to brute force and other attacks.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for generating a cryptographic key. The method includes receiving data associated with a user, performing a first encryption operation on the data associated with a user based on a device-specific value to yield first intermediate data, performing a second encryption operation on the first intermediate data based on the device-specific value to yield second intermediate data, and iteratively repeating the second encryption operation until a threshold is met, wherein each second encryption operation is performed on the second intermediate data from a previous second encryption operation. The data associated with a user can be a password or a hash of the password. The iterations produce a final cryptographic key, which can then be output and/or used for a cryptographic operation.

A system configured to generate a cryptographic key can include a processor and a set of registers, such as a seed register, a hidden cryptographic key register, and/or an iteration register. The system can include a first module configured to control the processor to receive a secret from a user, such as a password or a PIN, a second module configured to control the processor to store the secret, and a third module configured to store a hash of the secret in a seed register. A fourth module can be configured to control the processor to iteratively generate the cryptographic key by performing a first encryption operation on the seed register based on a device-specific value to yield first intermediate data, performing a second encryption operation on the first intermediate data based on the device-specific value to yield second intermediate data, and performing the second encryption operation iteratively until an iteration threshold is met, to generate a final result. The device-specific value can be used as a key. Each second encryption operation is performed on the second intermediate data from a previous second encryption operation. Then the system can store the final result in a hidden cryptographic key register. In one variation to improve security, the device-specific value is only accessible within the fourth module and is not directly accessible via the operating system or user-executable software, for example. The device-specific value can be embedded in a hardware component, such as an integrated chip. The device-specific identifier can also be unique to the system. For example, if the system is a smart phone, then every manufactured smart phone includes an identifier unique to that particular phone. The device-specific identifier can be a binary string, a numeric string, a hexadecimal string, and/or an alphanumeric string, for example. Other unique identification schemes are possible.

The system can include a dedicated hardware encryption engine that generates keys. The encryption engine can perform encryption according to virtually any encryption standard, such as advanced encryption standard (AES). The dedicated hardware encryption engine can include the seed register and the hidden key register, and these registers may only be readable within the dedicated hardware encryption engine.

The number of iterations can be based on a stored number in an iteration register. The number of iterations can be based on at least one of a fixed value, a parameter received as part of a request for the key, and a length of time. The combination of the number of iterations and the device-specific identifier limits the rate at which keys can be generated. For example, the device-specific identifier restricts at least a part of the iterations to being performed on a particular device. Thus, an attacker is unable to use a different, more powerful device to perform a brute force attack to discover the cryptographic key. Further, the number of iterations can be selected so that each request to generate a cryptographic key requires an amount of time which does not introduce a substantial delay for usual uses, such as a single request or a small number of requests, but which introduces a sufficiently long delay to slow down the rate (and chances of success) of a brute force attack.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 7 illustrates a first example method embodiment; and

FIG. 8 illustrates a second example method embodiment.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for improving security of user secrets such as passwords or PINs when generating cryptographic keys. A system, method and non-transitory computer-readable media are disclosed which generate cryptographic keys in a rate-limited and device-specific way. A brief introductory description of a basic general purpose system or computing device in FIG. 1 which can be employed to practice the concepts is disclosed herein. A more detailed description of how the keys are generated will then follow. Several variations shall be discussed herein as the various embodiments are set forth. The disclosure now turns to FIG. 1.

Figure 1:
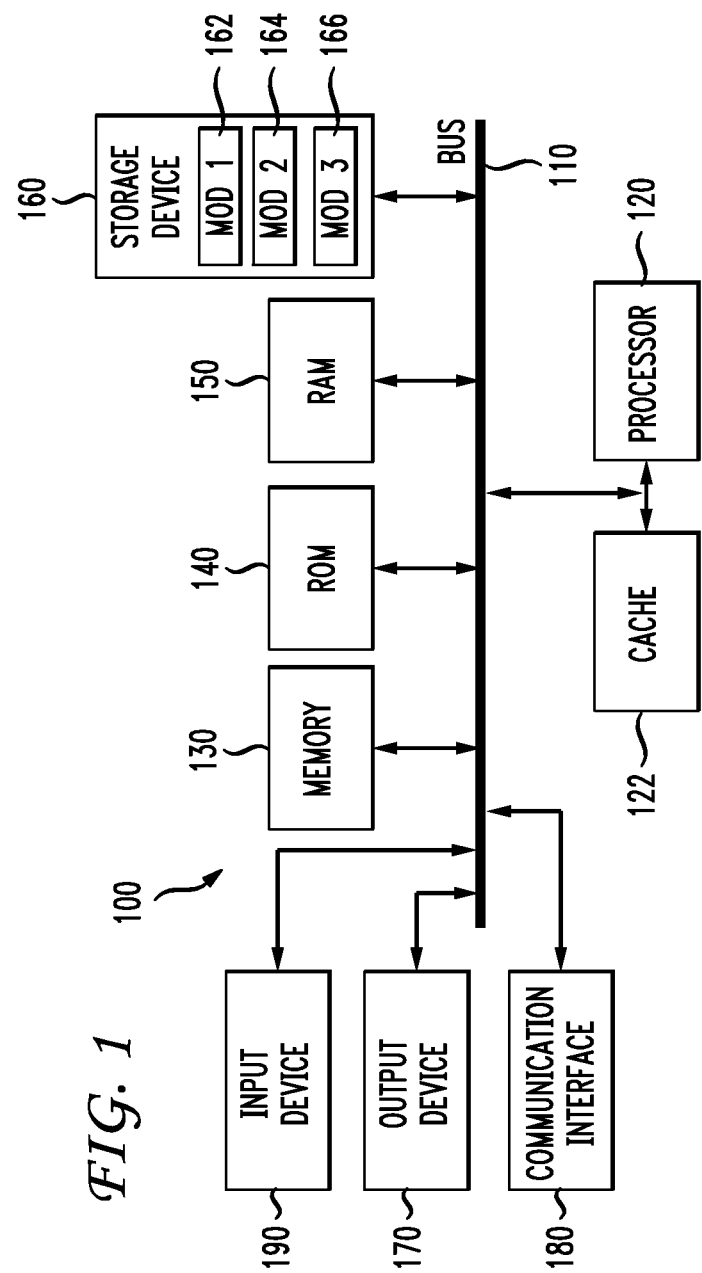
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.)

Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Having disclosed some components of a computing system, the disclosure now returns to a discussion of generating cryptographic keys in a rate-limited and device-dependent way. The approaches set forth herein can improve security of user data on user computing devices such as smart phones, tablets, and desktop computers by tying the key generation process to the user's device and by limiting the rate at which keys can be generated. This approach forces brute force attacks to occur on (or have access to) the actual device and prevents brute force attacks from occurring on off-line computers which could accelerate the attack. This approach also provides flexibility in selecting the amount of time required for exhaustive attacks. This approach can tie together hardware-implemented industry standard cryptographic algorithms so that software can not extract the final nor intermediate results of the key generation process. There is also no way for software to shorten the time required to generate a key.

Devices operating according to this disclosure include a unique device-specific key or identifier, such as a MAC address or Unique Device Identifier (UDID). For example, in the case of a System on a Chip (SoC), the device-specific key is different on every manufactured SoC. The unique device-specific key can optionally be derived from a combination of multiple sources, such as two separate chips each containing a portion of the unique device-specific key. The devices can also include a hardware encryption engine (according to AES or other encryption scheme) that uses the device-specific key. The AES operations can be chained. For example, the system can use AES with a 16 byte blocks to calculate 32 byte keys. In this case, the system can chain the second block back into the first.

A software program can store a user's password or a hash of the user's password in a seed register or other location. This example clarifies the intermediate results. However, generally the seed value does not need to be kept secret separate from the password. This approach can guarantee that the same password will generate a different key when the password is reused. This step can be part of hashing the user password to generate the initial seed value. The software program can also store a number of encryption iterations in a register to inform the encryption engine of the number of iterations to use when generating the new key. The hardware encrypts the seed data with the device-specific key to produce first intermediate data. The hardware then encrypts the intermediate data again with the device-specific key. The hardware would repeat this process for the specified number of iterations. The hardware stores the encrypted data from the final iteration in a register that is not readable by software, but that can be used as a key by other hardware assisted encryption operations. This iterative approach to key generation increases the computation time of a key, but it does not improve the actual security of the key. The number of iterations can be selected to require a certain amount of processing time for the initial key generation. This can ensure that a given device takes a minimum amount of time to generate a key, such as 300 milliseconds or 1 second. Increasing the computation time of a cryptographic key limits the rate or speed at which cryptographic keys can be generated, thereby lengthening the amount of time for an attacker to complete a brute force attack.

The system can incorporate a dedicated AES engine or a shared AES engine. The system can also incorporate other symmetric encryption algorithms, asymmetric encryption algorithms, and/or secure irreversible hashes. Software components can participate in the iteration process so long as the intermediate results are not software-accessible.

Figure 2:
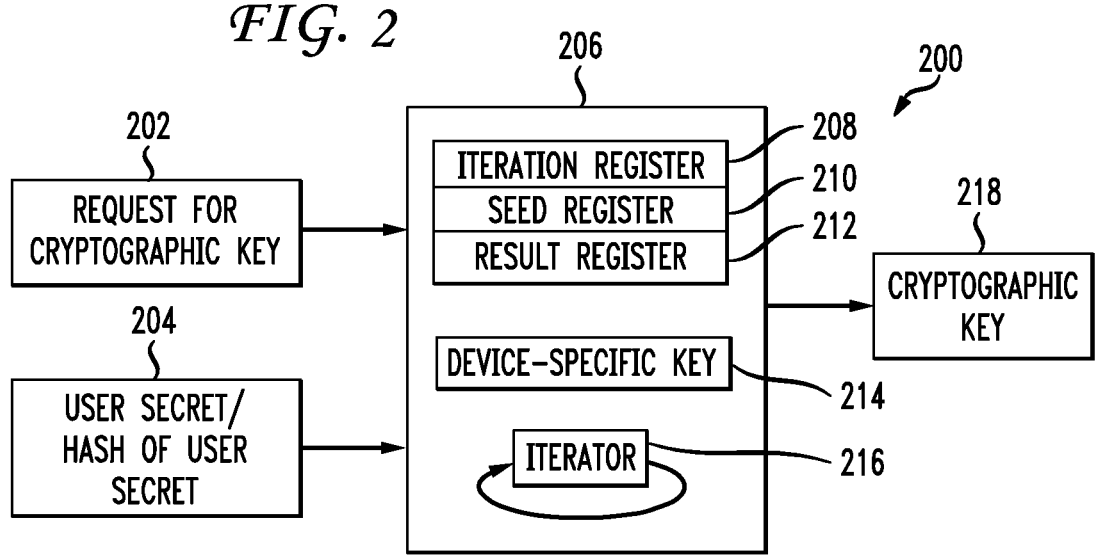
FIG. 2 illustrates an example architecture for generating a cryptographic key in a rate-limited way using a device-specific identifier.

FIG. 2 illustrates an example architecture 200 for generating a cryptographic key in a rate-limited way using a device-specific identifier. In this example architecture 200, an encryption module 206 receives a request for a cryptographic key 202 and a user secret or a hash of a user secret 204. The encryption module 206 can include several internally accessible registers, such as an iteration register 208, a seed register 210, and a result register 212, as well as storage for a device-specific key 214 (or access to the device-specific key). The encryption module 206 can be hardware, software, or a blend of hardware and software. The encryption module 206 stores the user secret or hash of a user secret 204 in the seed register 210 (or other location) and the iterator 216 performs one iteration of an encryption operation based on the value in the seed register 210 and the device-specific key 214 and stores the result in the result register 212. Based on the value of the iteration register 208, the encryption module 206 continues to perform at least one additional iteration of the encryption operation based on the value in the result register 212 and the device-specific key 214. The encryption module 206 can use a single memory location as the seed register 210 and the result register 212, essentially reusing the same memory location. After the iterator 216 performs a sufficient number of iterations according to the iteration register 208, the encryption module 206 outputs the result from the final iteration as a cryptographic key 218 in response to the request for the cryptographic key 202.

The iterator 216 can perform a same encryption operation at each iteration, or can apply different encryption algorithms for at least a portion of the number of iterations. For example, at even number iterations the system can apply a first encryption algorithm, and at odd number iterations the system can apply a second encryption algorithm. Alternatively, the request for a cryptographic key can include an indication of which iteration(s) to perform an alternative operation. The iterator 216 can then perform the alternative operation as indicated in the request. This approach can ensure that the resulting key retains a sufficient level of entropy.

The number of iterations to perform can be determined based on a particular amount of time or other source rather than a particular value stored in an iteration register 208. For example, the system can perform a number of iterations that lasts 500 milliseconds to slow the rate at which a brute force attack can be performed. Further, the number of iterations to perform can be based on the complexity of the user secret or hash of the user secret 204. For instance, if the user secret is a string of four numbers, the number of iterations can be greater to compensate for the original relatively weak user secret. Alternatively, if the user secret is a string of 20 characters including upper and lower case characters, numbers, punctuation marks, and other symbols, then the number of iterations can be fewer.

In one variation, the iterator 216 of the encryption module 206 can implement a particular encryption algorithm, such as AES, but can also apply or use other encryption algorithms. For example, the encryption module 206 can receive instructions from an external source to begin using a different encryption algorithm for a particular request for a cryptographic key or for a portion of a request for a cryptographic key. The instructions can even include all or part of the encryption algorithm to begin using. The instructions can designate one encryption algorithm from several available to the iterator 216. The iterator 216 can apply multiple different encryption algorithms in a set of iterations or the encryption module 206 can include multiple different iterators, not shown.

Figure 3:
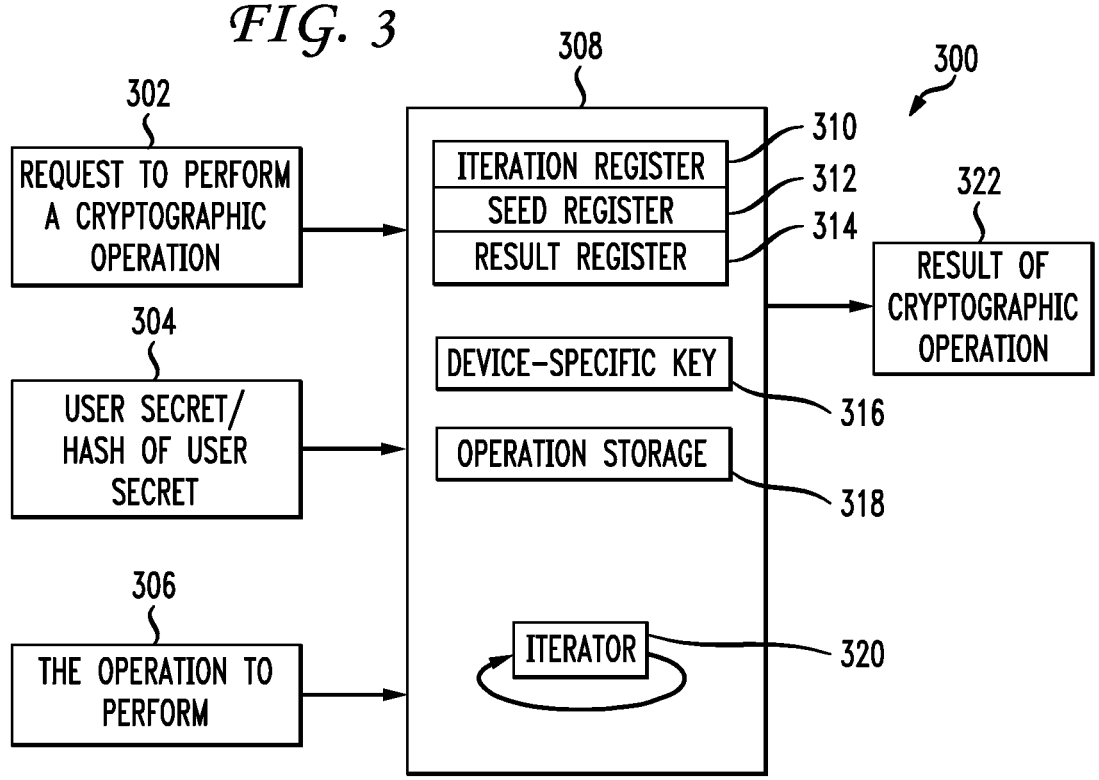
FIG. 3 illustrates an example architecture for performing a cryptographic operation in a rate-limited way using a device-specific identifier.

FIG. 3 illustrates an example architecture 300 for performing a cryptographic operation in a rate-limited way using a device-specific identifier. In this example architecture 300, an encryption module 308 receives a request to perform a cryptographic operation 302, a user secret or a hash of a user secret 304, and an operation to perform 306. The encryption module 308 can include several internally accessible registers, such as an iteration register 310, a seed register 312, and a result register 314, as well as storage for a device-specific key 316 (or access to the device-specific key). The device-specific key or device-specific identifier can be accessible within the encryption module 308, but inaccessible via external software calls. However, the device-specific key 316 may be readable by examining, via an electron microscope or similar equipment, some component of a computer chip storing the device-specific key. While this is possible, the time and resources needed for obtaining the device-specific key using this approach are prohibitive.

The encryption module 308 can be hardware, software, or a blend of hardware and software. The encryption module 308 stores the user secret or hash of a user secret 304 in the seed register 312 (or other location) and stores the operation to perform 306 in the operation storage 318. The encryption module 308 can also store any other data related to the operation in the operation storage 318. Then the iterator 320 performs one iteration of the encryption operation based on the value in the seed register 312 and the device-specific key 316 and stores the result in the result register 314. Based on the value of the iteration register 310, the encryption module 308 continues to perform at least one additional iteration of the encryption operation based on the value in the result register 314 and the device-specific key 316. After the iterator 320 performs a sufficient number of iterations according to the iteration register 310, the encryption module 308 applies the result from the final iteration to the operation to perform 306 which is stored in the operation storage 318 to generate a result. The encryption module 308 then outputs the result of the cryptographic operation 322.

Figure 4:
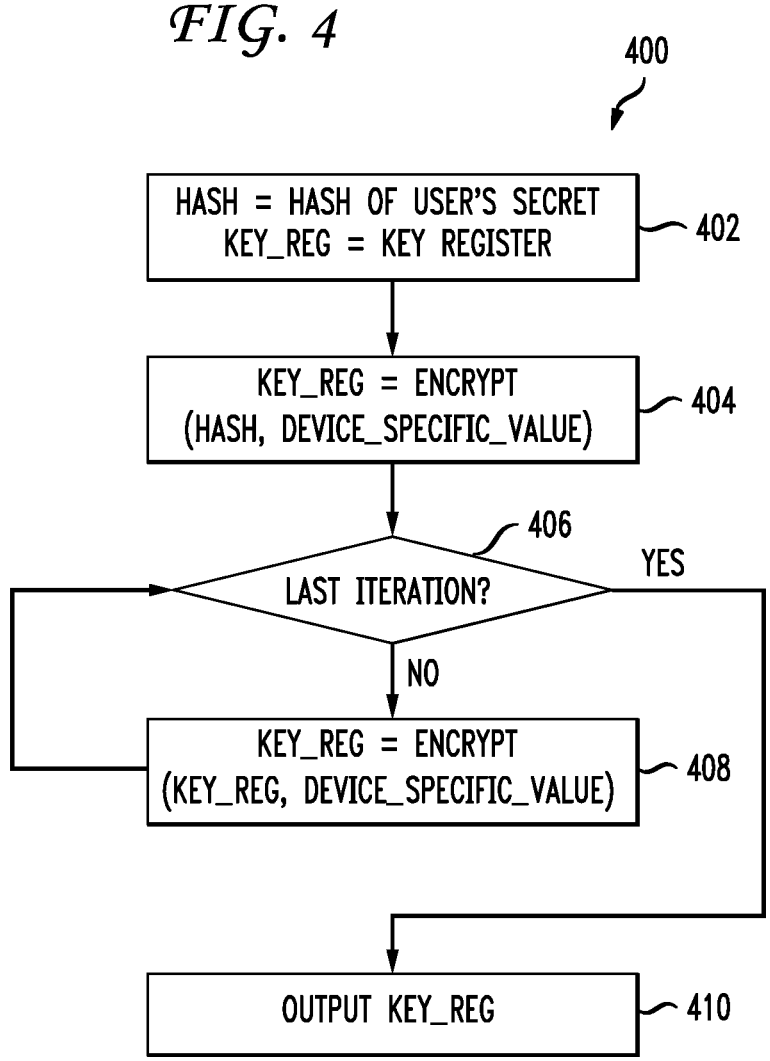
FIG. 4 illustrates an exemplary logical flow for generating a cryptographic key.

FIG. 4 illustrates an exemplary logical flow 400 for generating a cryptographic key, which can be used, for example, in either of FIG. 2 or FIG. 3 as set forth above. This logical flow 400 takes as input a hash and a key register 402. Then the logical flow 400 performs an encryption operation 404 using the hash and a device-specific value and assigns the result in the key register. Alternately, a user password is used in place of a hash in the logical flow 400. The logical flow 400 checks if the previous iteration is the last iteration 406. If not, the logical flow 400 continues to perform the encryption operation 408 using the key register and the device-specific value and returns to check if the previous iteration is the last iteration 406. If so, the logical flow 400 outputs the key register 410 as the final result.

Figure 5:
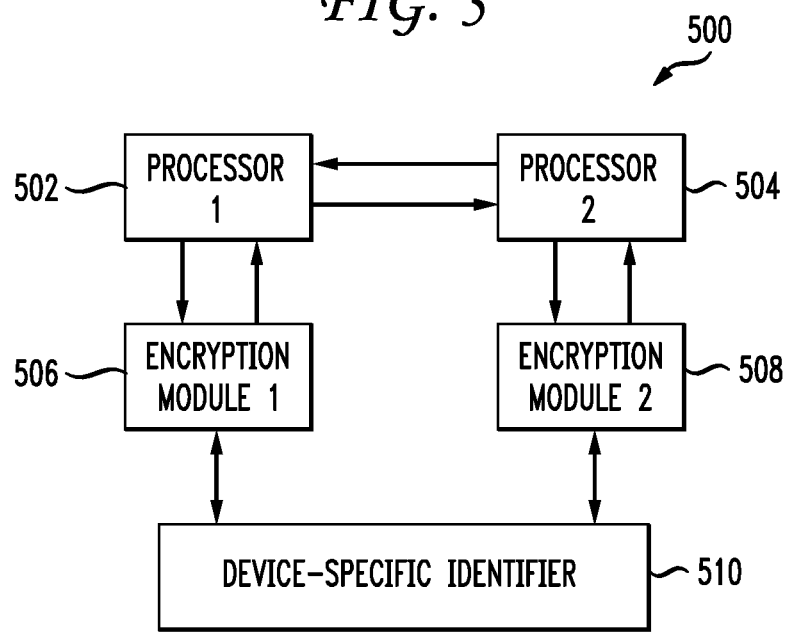
FIG. 5 illustrates two components that interact with each other based on results from respective encryption modules.

The disclosure now turns to FIG. 5 which illustrates an arrangement 500 of two components 502, 504 that interact with each other based on results from respective encryption modules 506, 508. In this arrangement 500, the first processor 502 and the second processor 504 have a need to communicate securely and/or establish a trusted relationship, for example. The processors 502, 504 can be hardware components such as an integrated circuit, a chipset, a processor, and so forth. The first processor 502 makes a request to a first encryption module 506 according to the principles disclosed above to iteratively generate a cryptographic key in a rate-limited fashion based on a device-specific identifier 510. Then the second processor 504 makes a second request to a second, separate encryption module 508 to iteratively generate a cryptographic key also based on the device-specific identifier 510. Then, based on the resulting cryptographic keys, the two processors 502, 504 establish a trusted relationship, perform a joint operation, and/or coordinate a secure interaction.

In some variations, the encryption modules 506, 508 are initialized by retrieving a seed value from a seed register, and retrieving a number of iterations from an iteration register. The seed register and iteration register can be a shared resource or each encryption module 506, 508 can have its own separate register for these values. Each encryption module 506, 508 can use a same iteration value and/or seed value or the encryption modules 506, 508 can use different values for either the iteration value or the seed value. For example, if the first encryption module 506 performs 49 iterations and sends its result to the second encryption module 508 which performs 50 iterations, the second encryption module can perform an additional iteration to the result from the first encryption module 506 to determine if the two results match. In this way, the two processors 502, 504 can ensure that commands and data flowing between them are from an authorized, approved, and/or trusted source.

Figure 6:
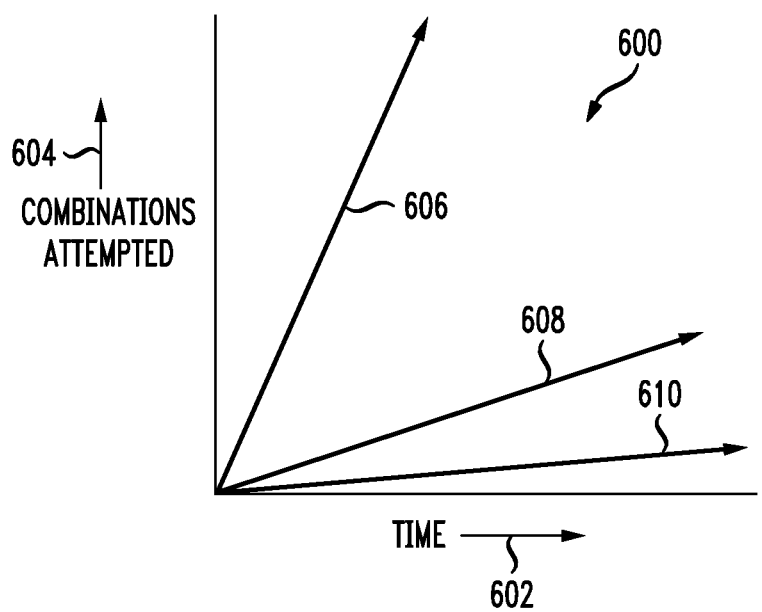
FIG. 6 is an example chart illustrating rates of attack for brute force attacks on different platforms.

FIG. 6 is an example chart 600 illustrating rates of attack for brute force attacks on different platforms. The chart 600 shows combinations attempted 604 on the y-axis and time 602 on the x-axis. The middle line 608 shows an attack rate for a device-specific, non-rate-limited brute force attack on a device such as a smartphone. The brute force attack in this scenario processes a modest number of combinations over time. The top line 606 shows an attack rate for a non-device-specific and non-rate-limited brute force attack on a much more powerful computer, such as a cluster of computers applied in a parallelized brute force attack. This attack processed a significantly higher number of combinations in the same amount of time as the middle line 608. In contrast, the bottom line 610 shows an attack rate for a device-specific, rate-limited brute force attack. In this scenario, the brute force attack is limited to being performed on-device and is rate-limited. Thus, in a relatively less-capable device, such as a smartphone or tablet computer, restricting possible brute force attacks to the device, i.e. by tying key generation to a device-specific identifier, would require a substantially higher amount of time for a successful brute force attack.

Having disclosed some basic system components and concepts, the disclosure now turns to the exemplary method embodiments shown in FIGS. 7 and 8. For the sake of clarity, the methods are discussed in terms of an exemplary system 100 as shown in FIG. 1 configured to practice the respective methods. The steps outlined herein are exemplary and can be implemented in any combination thereof, including combinations that exclude, add, or modify certain steps.

FIG. 7 illustrates a first example method embodiment. A system, such as the system 100 shown in FIG. 1, configured to practice the method receives a hash of data associated with a user (702). The system can retrieve the hash from a seed register, as described above. The data associated with the user can be a user password, PIN, biometric identifier, other data that a user actively enters or that can be inferred or retrieved based on other data associated with the user, and/or a combination thereof. However, certain biometric identifiers may be insufficiently stable for key derivation.

The system 100 performs a first encryption operation on the hash based on a device-specific value to yield first intermediate data (704) and performs a second encryption operation on the first intermediate data based on the device-specific value to yield second intermediate data (706). The system can store the first intermediate data and the second intermediate data in a hidden key register. The system 100 can then repeat the second encryption operation until a threshold is met, wherein each second encryption operation is performed on the second intermediate data from a previous second encryption operation, to generate a final cryptographic key (708) and output the final cryptographic key (710). The threshold can be based on a desired execution time and/or a number of iterations. The system can output the final cryptographic key by storing the final cryptographic key in a hidden key register. The system can then use the final cryptographic key as an encryption key for a hardware-assisted encryption operation.

In one implementation, each iteration performs a single encryption operation starting using value N and producing value N+1. At the beginning, the first value (N=0) is the user password/PIN, optionally hashed. The starting value for the next iteration (N+1) is the result of the previous operation (N=>AES=>N+1). The output from the last operation is the new key. If the value being encrypted is assumed to come from a scratch register, before the first iteration the scratch register is written with the user data. After each iteration, the system writes the encryption result to the same scratch register.

FIG. 8 illustrates a second example method embodiment for requesting a key from a dedicated hardware encryption engine that can serve as a 'black box' that does not provide access to the internal workings of the hardware encryption engine, and simply accepts a set of inputs and provides an output. For example, the dedicated hardware encryption engine may have access to the device-specific key and use the device-specific key when encrypting, but does not provide a software-accessible way to read the device-specific key. This method embodiment is also discussed in terms of a system 100 configured to practice the method. First the system 100 receives a user password (802). Then the system 100 requests a key from a dedicated hardware encryption engine by passing the user password to the dedicated hardware encryption engine (804).

The dedicated hardware encryption engine stores a hash of the user password in a seed register (806). The dedicated hardware encryption engine performs a first encryption on the hash in the seed register with a device-specific key to generate first intermediate data (808) and performs a second encryption on the first intermediate data with the device-specific key to generate second intermediate data (810). The device-specific key or value can be embedded in a hardware component and can be an absolute unique identifier for a device, such that no two devices (or no two manufactured instances of a same device type) share the same unique identifier. Then the dedicated hardware encryption engine stores the second intermediate data in a hidden key register (812), iteratively performs the second encryption on the hidden key register with the device-specific key until a threshold is met (814), and outputs data in the hidden key register as the key (816). The seed register and the hidden key register can be part of the dedicated hardware encryption engine and can be readable only within the dedicated hardware encryption engine. The dedicated hardware encryption can determine the threshold based on a number of iterations retrieved from an iteration register. The number of iterations to perform can be based on a fixed value, a parameter received as part of a request for the key, and/or a length of time.

Then the system 100 receives the key from the dedicated hardware encryption engine (818) and can use that key to secure data, retrieve data, perform operations, communicate securely with a server, and/or for other purposes. The generated key can be used by the dedicated encryption engine and return only the result of that operation to the originator of the request. In this way, the system can respond to the request appropriately without revealing the device-specific identifier or other secret or protected information that was used to generate a response.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied to improve resilience to brute force attacks or similar attacks by limiting the speed at which such attacks are possible. Those skilled in the art will readily recognize various modifications and changes that may be made to the principles described herein without following the example embodiments and applications illustrated and described herein, and without departing from the spirit and scope of the disclosure.

We claim:

1. A method comprising:
   receiving and storing secret data associated with a user;
   computing a hash of the secret data and storing the hash of the secret data in a seed register;
   iteratively generating a cryptographic key by performing the following operations:
      performing a first encryption operation on the seed register based on a device-specific value to yield first intermediate data;
      performing a second encryption operation on the first intermediate data based on the device-specific value to yield second intermediate data;
      repeating the second encryption operation until a specified iteration threshold is met, to generate a final cryptographic key, wherein each second encryption operation is performed on the second intermediate data from a previous second encryption operation, wherein the specified iteration threshold is selected to require a minimum processing time to generate the final cryptographic key; and
   outputting the final cryptographic key in a hidden cryptographic key register.

2. The method of claim 1, wherein the secret data associated with the user is received from the seed register.

3. The method of claim 1, wherein the secret data associated with the user is a hash of a password.

4. The method of claim 1, wherein the secret data associated with the user is a password.

5. The method of claim 1, wherein the first intermediate data and the second intermediate data are stored in a hidden key register.

6. The method of claim 1, wherein outputting the final cryptographic key comprises storing the final cryptographic key in a hidden key register.

7. The method of claim 6, wherein the final cryptographic key is used as an encryption key for hardware-assisted encryption operations.

8. The method of claim 1, wherein the specified iteration threshold is selected to specify one of a desired execution time and a number of iterations.

9. The method of claim 8, wherein the number of iterations is read from an iteration register.

10. A system for generating a cryptographic key, the system comprising:
    a storage comprising a seed register, a hidden encryption key register, and a plurality of modules;
    a processor coupled to the storage;
    a first module comprising processor-executable instructions to receive a secret from a user;
    a second module comprising processor-executable instructions to store the secret;
    a third module comprising processor-executable instructions to compute a hash of the secret and store the hash of the secret in the seed register;
    a fourth module comprising processor-executable instructions that implement an encryption module configured to iteratively generate the cryptographic key according to a method comprising:
       performing a first encryption operation on the seed register based on a device-specific value to yield first intermediate data,
       performing a second encryption operation on the first intermediate data based on the device-specific value to yield second intermediate data,
       wherein the second encryption operation is performed iteratively, until a specified iteration threshold is met, to generate a final result, wherein each second encryption operation is performed on the second intermediate data from a previous second encryption operation, wherein the specified iteration threshold is selected to require a minimum processing time to generate the final result; and
    a fifth module comprising processor-executable instructions to store the final result in the hidden cryptographic key register.

11. The system of claim 10, wherein the secret is one of a password and a personal identification number.

12. The system of claim 10, wherein the device-specific value is accessible only within the fourth module.

13. The system of claim 12, wherein the device-specific value is embedded in a hardware component and is an absolute unique identifier for a device.

14. The system of claim 10, wherein the number of iterations is based on a complexity of the secret.

15. A non-transitory computer-readable storage medium storing instructions which, when executed by a computing device, cause the computing device to perform a method comprising:
    receiving a user password;
    requesting a cryptographic key from a dedicated hardware encryption engine by passing the user password to the dedicated hardware encryption engine, wherein the dedicated hardware encryption engine performs operations comprising:
       computing a hash of the user password and storing the hash of the user password in a seed register;
       iteratively generating the cryptographic key by performing the following operations:
          performing a first encryption on the hash of the user password in the seed register with a device-specific key to generate first intermediate data;
          performing a second encryption on the first intermediate data with the device-specific key to generate second intermediate data;

storing the second intermediate data in a hidden key register;

iteratively performing the second encryption on the hidden key register with the device-specific key until a specified iteration threshold is met, to generate the final cryptographic key, wherein the specified iteration threshold is selected to require a minimum processing time to generate the final cryptographic key to be stored in the hidden key register as the cryptographic key; and outputting the cryptographic key in the hidden key register; and receiving the cryptographic key from the dedicated hardware encryption engine.

16. The non-transitory computer-readable storage medium of claim 15, wherein the user password comprises a hash of a password.

17. The non-transitory computer-readable storage medium of claim 15, wherein the hardware encryption engine performs encryption according to AES.

18. The non-transitory computer-readable storage medium of claim 15, wherein the seed register and the hidden key register are part of the dedicated hardware encryption engine.

19. The non-transitory computer-readable storage medium of claim 15, wherein the seed register and the hidden key register are only readable within the dedicated hardware encryption engine.

20. The non-transitory computer-readable storage medium of claim 15, wherein the dedicated hardware encryption determines the threshold based on a number of iterations retrieved from an iteration register.

21. The non-transitory computer-readable storage medium of claim 20, wherein the number of iterations to perform is based on at least one of a fixed value, a parameter received as part of a request for the key, and a length of time.

22. The non-transitory computer-readable storage medium of claim 15, wherein the user password is received from a stored location on the computing device.

23. A method of coordinating secure interactions based on cryptographic keys, the method comprising:

initializing a first encryption engine and a second encryption engine, wherein the first encryption engine is associated with a first respective piece of hardware and the second encryption engine is associated with a second respective piece of hardware, and wherein initializing an encryption engine comprises receiving a seed value from a seed register and a number of iterations for performing an encryption operation, wherein the seed value is determined by computing a hash of secret data associated with a user and the seed value is stored in the seed register;

iteratively generating a first cryptographic key and a second cryptographic key by performing the following operations:

performing a first encryption operation A based on a device-specific value via the first encryption engine to yield first intermediate data A;

performing a second encryption operation A based on the device-specific value via the second encryption engine to yield second intermediate data A;

performing a first encryption operation B based on the device-specific value on the first intermediate data A to yield first intermediate data B;

performing a second encryption operation B based on the device-specific value on the second intermediate data A to yield second intermediate data B;

repeating the first encryption operation A via the first encryption engine until a specified iteration threshold is met, wherein each iteration of the first encryption operation A is performed on the first intermediate data A from a previous iteration, to generate a first cryptographic key;

repeating the second encryption operation B via the second encryption engine until the specified iteration threshold is met, wherein each iteration of the second encryption operation B is performed on the second intermediate data B from a previous iteration, to generate a second cryptographic key, wherein the specified iteration threshold is selected to require a minimum processing time to generate the second cryptographic key; and if the first cryptographic key matches the second cryptographic key, coordinating a secure interaction between the first respective piece of hardware and the second respective piece of hardware.

24. The method of claim 23, wherein for each of the first and second encryption engines:

receiving a number of iterations comprises retrieving a number of iterations from an iteration register.

25. The method of claim 24, wherein the seed value varies for each encryption engine.

* * * * *